United States Patent [19]

Jones

[11] 4,222,787
[45] Sep. 16, 1980

[54] ASPHALT MIXTURE

[76] Inventor: Cyril T. Jones, 14216 N. Bluff Rd., White Rock, B.C., Canada, V4B 3C4

[21] Appl. No.: 17,426

[22] Filed: Mar. 5, 1979

Related U.S. Application Data

[63] Continuation-in-part of Ser. No. 804,055, Jun. 6, 1977, abandoned.

[51] Int. Cl.² .............................................. C08L 95/00
[52] U.S. Cl. ................................. 106/281 R; 404/80; 404/81
[58] Field of Search ................... 106/281 R, 284, 278; 44/23, 24, 61, 19; 404/80, 81

[56] References Cited

U.S. PATENT DOCUMENTS

| | | | |
|---|---|---|---|
| 1,261,645 | 4/1918 | Sutcliffe | 44/23 |
| 1,276,429 | 8/1918 | Smith | 44/23 |
| 1,741,193 | 12/1929 | Lessing | 44/23 |
| 1,893,555 | 1/1933 | Komarek et al. | 44/23 |
| 3,140,242 | 7/1964 | Work et al. | 202/26 |
| 3,184,293 | 5/1965 | Work et al. | 44/23 |
| 3,926,576 | 12/1975 | Schmalfeld et al. | 44/10 |

*Primary Examiner*—Hosea E. Taylor
*Assistant Examiner*—Amelia B. Yarbrough
*Attorney, Agent, or Firm*—Hughes & Barnard

[57] ABSTRACT

A process for preparing an improved asphalt mixture by adding coal materials thereto. Low carbon content coal materials are separated into first and second portions, the first portion being soft-burned at approximately 600° F., and the second portion being exposed to a number of wetting and drying cycles, followed by a thorough leaching. The first and second portions are crushed and screened to produce a fine particulate coal material having a maximum diameter passing through a 200 mesh screen, and a larger size coal material having a maximum diameter of ¾ of an inch. In a first embodiment, an asphalt paving material is produced by adding the fine particulate coal materials to an asphalt/aggregate mixture in a proportion of approximately 75% of the first portion and approximately 25% of the second portion of the fine particulate coal materials, such that the coal materials equal approximately 6 to 8% by weight of the total mixture. The resulting asphalt mixture is heated at approximately 300° and may be stored at this temperature in order to increase the mechanical bonds between the asphalt and aggregate. In a second embodiment the larger size coal materials and/or the fine particulate coal materials are used as a filter medium to remove pollutants from a liquid effluent stream, and are then added to an asphalt mixture with the fine particulate coal materials in the same proportions as in the first embodiment. The asphalt/coal material mixture is then heated at approximately 300° F. and may be stored for a period of time to increase the mechanical bonds between the asphalt and coal materials. The resulting mixture may be compressed into any desirable shape, the pollutants being effectively sealed within the coal materials, providing safe and efficient long term storage or disposal.

29 Claims, 2 Drawing Figures

ASPHALT MIXTURE

CROSS REFERENCE TO RELATED APPLICATIONS

This is a continuation-in-part application to my pending U.S. patent application, entitled Disposal of Toxic Pollutants, Ser. No. 804,055, filed June 6, 1977, now abandoned.

BACKGROUND OF THE INVENTION

The present invention relates to a method of producing an improved asphalt-aggregate mixture, and the product produced by practicing the method.

Paving materials which are most commonly used in broad applications, (such as highways, parking lots and airports) are concrete on asphalt-aggregate mixtures. While the former may be more durable, it is considerably more costly and requires more sophisticated equipment and construction techniques to apply. In many instances, asphalt may be chosen rather than concrete to pave a large area even though its anticipated useful life may be somewhat shorter. While asphalt is cheaper and easire to apply the structural integrity of an asphalt surface may be degraded in various ways, depending upon the environmental conditions existing in the particular area. In those areas subject to extremely hot summertime temperatures, asphalt may have a tendency to become quite soft and therefore readily deformed by vehicles moving over its surface (thereby leading to the phenomenon of "wash boarding"). In those areas subject to below freezing weather for a considerable period of time, the spring thaw may produce severe frost-heaving which may result in frequent severe potholes.

In both cases referred to above, the degradation of the asphalt surface is due to the separation of the petroleum based asphalt mixture from the aggregates mixed therewith (such as sand or pebbles). If this bond between the aggregate and the asphalt mixture could be increased sufficiently at a reasonable increase in cost which would not negate the economic advantages of using asphalt as opposed to concrete, a superior paving material would be produced at a considerable savings over concrete.

By the same token, methods of storing toxic pollutants have traditionally proved inadequate due to the relatively short life-span of the materials used to encase the toxic pollutants. For example, pollutants stored in metal or concrete containers may have an effective life-span of only a few hundred years, whereas the toxicity of heavy metals or radioactive effluent may not decrease appreciably over a period of several thousand years. Therefore, when the container in which the pollutants have been stored begins the degradation process, there is a very distinct possibility the effluent contained therein will be released to the surrounding environment. Widespread contamination of water, air and/or soil may result therefrom. Therefore, a material which can effectively seal the pollutants in impermeable and unbreakable bonds will negate the possibility of contamination resulting from the break-down of containers holding the pollutants.

SUMMARY OF THE INVENTION

In the present invention, a method of producing an improved asphalt/aggregate mixture is disclosed which comprises the steps of separating a low carbon content coal material into first and second portions, the first portion being soft-burned at a temperature of from 350° F. to 850° F., and the second portion being subjected to one or more wetting and drying cycles followed by a thorough leaching with one, or a combination of, the liquids selected from the group comprising hot or cold water, steam, and an acid or a base. The first and second portion are crushed and screened to produce fine particulate coal material having a maximum diameter passing through a 200 mesh screen, and a larger sized coal material having a maximum diameter of ¾ of an inch. Either or both of the fine particulate coal materials and the larger size coal materials may be admixed with an asphalt (and/or crushed rock aggregate) mixture in a standard pug mill at an elevated temperature for a period of time sufficient to thoroughly intermix the asphalt mixture with the coal materials. The resulting mixture may be further heated and stored for a period of time to increase the mechanical bonds between the asphalt and the coal materials.

In a first embodiment of the present invention, an asphalt mixture suitable for paving large areas such as roadbeds or parking lots is produced. In the first embodiment, the first and second portions of the fine particulate coal materials are added to an asphalt/aggregate mixture comprising a typical petroleum asphalt mixture and non-coal aggregates, with the fine particulate coal materials being added in a proportion of at least 50% of the first portion of said fine particulate coal materials, such that the coal materials comprise approximately 6 to 8% by weight of the total asphalt/aggregate mixture. The coal materials are selected from a group consisting of bone coal, coal shale, clayey coal, near coal, burned and unburned coal wastes, and brown coal. The soft burning of the first portion of the fine particulate coal materials is advantageously practiced at 550° F. to 650° F. for from two to ten hours. Maximum bond strength may be effected by mixing the fine particulate coal materials with the asphalt aggregate mixture in the proportion of 3 to 4 parts of the first portion to one part of the second portion. A second embodiment of the present invention results in an asphalt/aggregate mixture which is suitable for encapsulating toxic pollutants for long term storage or disposal. In the second embodiment the larger sized coal materials of the first and/or second portions are provided as a filter medium through which is directed a pollutant-containing liquid stream. After the pollutants have been absorbed upon the larger sized coal materials, they may be added to a typical petroleum asphalt mixture. To this mixture the first and second portions of the fine particulate coal material are added in a proportion of at least 50% of the first portion of the fine particulate coal materials, such that they equal 6 to 8% by weight of the total asphalt coal material mixture. The fine paticulate coal materials may be added in a proportion of from 3 to 4 parts of the first portion to one part of the second portion fine particulate coal materials. The resulting mixture may be compressed into any desired shape for long term storage or disposal.

DETAILED DESCRIPTION OF THE PREFERRED EMBODIMENTS

Figure 1:
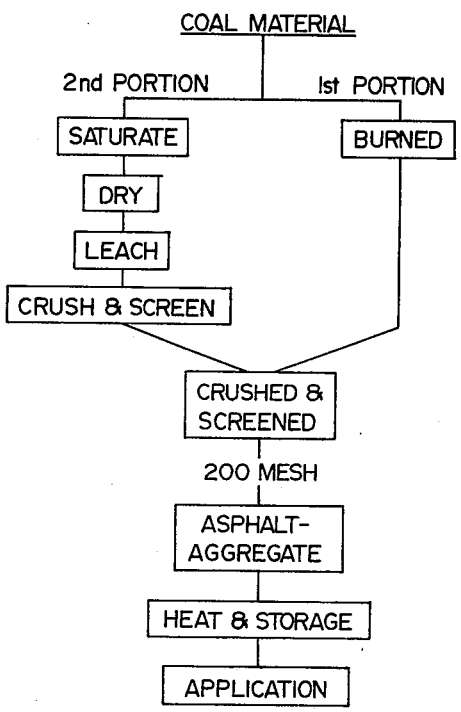
FIG. 1 is a flow diagram showing the various facets of the process for producing an improved asphalt paving material of the first embodiment of the present invention.
Figure 2:
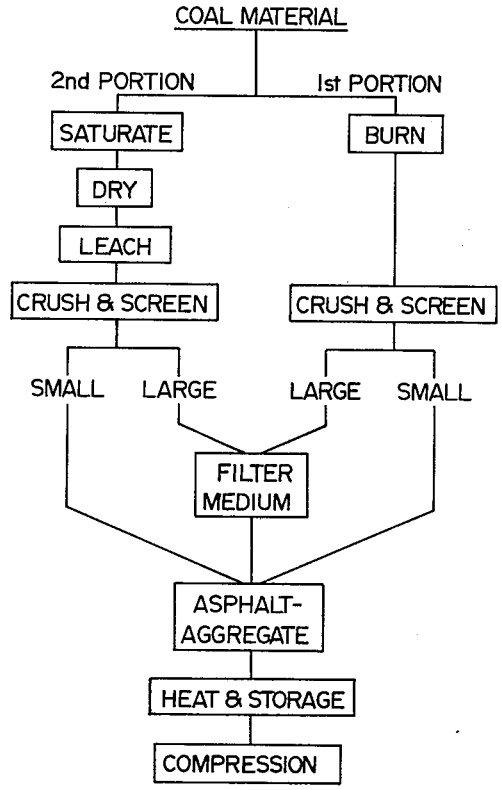
FIG. 2 is a flow diagram showing the various facets of the process for producing an asphalt pollution storage material according to the second embodiment of the present invention.

In practicing the present invention and with reference to FIG. 1, any type of low grade, low carbon content coal material may be utilized. Such coals may have little or no commercial value for their B.T.U. content, but are especially useful to the present invention. Such coal typically contains as much as 50% by weight of non-combustible material, including moisture, dirt and ash. Coal material which has been found acceptable in practicing the present invention includes bone coal, coal shale, clayey coal, near coal, fly ash, lenardite, and coal wastes which are either burned or unburned. The coal wastes may result from the mining and processing of any kind of coal material. The more valuable coal materials (such as anthracite coal) are less desirable due to their lower content of non-carbon materials.

The coal material is separated into a first portion which is to be soft-burned (a term well-known in the art, meaning to burn slowly at a relatively low temperature), and a second portion whose internal and external surface areas are to be expanded and leached. The coal material is crushed and sized, the sizing resulting in a fine particulate coal material having a maximum particle diameter passing through a 200 mesh screen (with no minimum diameter), and a larger sized coal material having a minimum diameter sufficient to be retained upon a 200 mesh screen, and a maximum diameter of approximately ¾ of an inch. The coal materials may be crushed and sized prior to soft burning the first portion and expanding and leaching the second portion, or subsequent to these processes. Due to the difficulty in handling the fine particulate coal material, it may be easier to produce the first and second portions prior to crushing and sizing the coal materials.

The following examples are illustrative of the invention but are not intended to be limiting in any manner.

EXAMPLE 1

In producing an asphalt mixture for use as a paving compound, a petroleum asphalt with penetration grade 85/100 was mixed with common river sand in an asphalt pugmill at approximately 350° F. To this asphalt/aggregate mixture was added a fine particulate coal material produced by crushing and screening bone coal so that the maximum particle diameter passes through a 200 mesh screen. A first portion of the coal material is calcined in a conventional furnace at a temperature of 600° F. for approximately 4 hours. (Alternatively, the coal material may be crushed and screened to the desired size after it has been soft-burned.) A second portion of the coal materials is produced by spreading the coal materials one to three feet deep over a broad confined area and sprinkle irrigating with water for a period of time sufficient to at least moisten the lowermost coal materials. The coal materials are then allowed to dry by exposure to solar radient energy, the process being repeated daily for a period of seven days. At the end of seven days, the coal materials are flood irrigated so that all of the coal particles are totally saturated with water, which is then drained and the coal materials are allowed to completely dry. At this point, the coal materials are crushed and screened so that the maximum particle size passes through a 200 mesh screen.

The coal materials resulting from the above processes are added to the asphalt/aggregate mixture in the asphalt pugmill in the proportion of 75% of the first portion and 25% of the second portion, such that the total coal materials equal approximately 6 to 8% by weight of the asphalt/aggregate mixture. The coal materials are admixed with the asphalt mixture for a period of at least 3 minutes at at least 300° F., at which time the mixture is suitable for broad application. After 3 to 5 minutes of heating, the mixture has a Marshall test breaking point of approximately 1200 pounds per square inch (psi), and after 4 hours, a breaking point of approximately 2750 psi (as opposed to a standard asphalt/aggregate mixture having a Marshall test breaking point of 260 psi). When applied as asphalt paving on a roadbed, the resulting mixture may be applied approximately 2.3 inches thick at a cost of approximately $8,000 per mile, whereas standard asphalt/aggregate mixtures must be applied 4 inches thick at a cost of approximately $14,000 per mile. Therefore, a 75% increase in strength for equivalent thicknesses at a 30%+ decrease in cost may be realized by using the method and product of the present invention.

EXAMPLE 2

The method of the second embodiment of the present invention results in a coal material which is an effective long-term storage and disposal medium for toxic pollutants. A coal material similar to that utilized in example 1 is divided and processed into first and second portions as described in example 1, except that, in addition to producing fine particulate coal material having a maximum diameter passing through a 200 mesh screen, both the first and the second portions also contain a larger size coal material having a maximum diameter of ¾ of an inch. Experimentally, using larger size coal materials of the second portion, placed within a glass tube having an inside diameter of 4.76 centimeters and a 140 centimeter length, solutions containing heavy metal pollutants were directed therethrough and the decrease in pollutants contained in the liquid stream was determined. A flow rate of 1 gallon per minute per each square foot (estimated) of surface area of coal materials was effected, with the liquid effluent stream being recirculated through the column in a circuitous path for a period of 58 days.

Using an initial concentration of 100 parts per million (ppm) lead in the effluent stream, 97+% of the lead was removed. Using similar concentrations, 98+% of mercury was removed, 91+% of copper was removed, 85+% of zinc was removed, and 77+% of cadmium was removed.

After the pollutants have been absorbed into the coal materials in the filter medium, they are then combined with the asphalt mixture in a conventional pugmill as in EXAMPLE 1. The fine particulate coal materials of the first and second portions are also combined therein as in EXAMPLE 1. The resulting mixture is heated, with increases in strength of the resulting asphalt mixture similar to those described in EXAMPLE 1.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

The first portion of the coal material is placed in a conventional oven and soft-burned at a temperature of between 350° F. and 850° F. with limited access to air for from 2 to 10 hours. The burning process should be carefully controlled so as to prevent excessive self-combustion of the coal materials. The coal remaining after the burning process is rendered quite porous due to the fact that most of the combustible carbonacious materials have been driven off (such as methane and other products from the decomposition of organic matter). The coal materials remaining have a very low apparent density and a specific gravity of approximately 1.0.

The second portion of the coal materials are exposed to water for from 2 to 4 hours. This may be accomplished by spreading the coal materials over a large area and either sprinkling or flooding with water or by immersing the coal materials in a water bath while travelling on a conveyor belt. By so wetting the coal materials, the coal absorbs water and expands its internal and external surface area appreciably. After the initial wetting, the coal materials are dried by application of artificial heat or by exposure to sunlight. It has been found that by subjecting the coal materials to one wetting and drying cycle per day for a period of seven days may result in a one hundredfold expansion of internal and external surface area by creating numerous small fractures throughout the coal materials. The coal materials are then completely saturated with water in order to leach water soluble materials therefrom. This saturation may be for as little as one hour if sufficient water movement through the coal materials can be effected. If a sufficiently low-grade coal material is used, it is possible to remove up to 30% of the weight of the coal materials as water soluble materials and other removable debris in this leaching process.

If it is desired to produce a highly adsorbent coal material, instead of leaching with water, any one of a number of different acids or bases may be used, depending upon the type of materials it is desired to remove. For example, by subjecting the coal materials to a solution of either hydrochloric acid or sodium hydroxide, a wide range of chemical compounds may be removed from the coal material which would otherwise remain after leaching with water. By leaching with either an acid or a base, followed by the other, maximum chemical leaching may be effected. While leaching with an acid or base may remove various chemical compounds which would otherwise remain, it is a relatively expansive and time consuming operation which in most cases would not be necessary.

Improved Asphalt Paving Mixture

When the original coal material is processed to this condition, with both the first and second portions having fine particulate material and larger sized material, the coal materials may be utilized in one of two methods. In the first embodiment of the present invention, only the fine particulate coal mixtures are utilized, being added to an asphalt/aggregate mixture at the site of a typical asphalt pugmill. Any petroleum based asphalt and crushed rock aggregate mixture which has been found suitable for a particular locality may be utilized, a typical asphalt being penetration grade 85/100. The fine particulate coal material is added to the asphalt/aggregate mixture in the pugmill in a proportion of at least 50% of the fine particulate materials being of the first portion. It has been found that a mixture of 75% first portion and 25% of the second portion is optimal with the fine particulate coal materials being equal to from 6 to 8% by weight of the total asphalt/aggregate mixture. The fine particulate coal materials are admixed with the asphalt/aggregate mixture which had been previously heated at a temperature of at least 300° F. in the pugmill for at least 3 minutes. The asphalt-fine particulate coal material is mixed in the pugmill for at least 3 to 5 minutes at 300° F. to 400° F. The total mixture may be stored in a silo at a temperature of at least 300° F. until its use at a later time.

Treating an asphalt/aggregate mixture with fine particulate coal materials of the present invention dramatically increases the adhesive bonds between the asphalt mixture and the aggregates contained therein. The coal materials of the first and second portion, resulting from soft burning and leaching, are considerably more porous typical aggregates used in producing asphalt paving. Because of their highly expanded surface areas and high degrees of porosity, highly viscous petroleum asphalt is capable of entering the porous and fractures of the fine particulate coal material, and upon cooling and hardening, produce a mechanical bond which is many times stronger than that achieved otherwise. It has been found that storage of the asphalt/aggregate mixture with the fine particulate coal materials added thereto at temperatures of approximately 300° F. greatly increases the strength of the bonds over that without such storage (presumably because of greater infiltration into the porous structure of the fine particulate coal material by the viscous asphalt mixture).

Because the resulting asphalt mixture has a considerably higher bond strength between the asphalt and the aggregate than conventional asphalt/aggregate mixtures, less is needed over a given area to produce the same or better results as pavement. It has been estimated that the use of fine particulate coal materials of the present invention would reduce the cost per mile of asphalt pavement by approximately ⅓ when compared with untreated asphalt (approximately $4,600 total cost per mile as opposed to approximately $7,000 total cost per mile for untreated asphalt/aggregate mixtures). In addition to costing less per mile, the use of the present invention increases the strength of the asphalt/aggregate mixture by a factor of from 4 to 10. After the addition of the fine particulate coal materials of the present invention, and the standard heating time of 3 to 5 minutes, the degradation point (as measured by the Marshall test) is approximately 1,200 pounds per square inch (psi), whereas standard asphalt/aggregate mixtures have a degradation point of approximately 260 psi. By heating and storing the asphalt/aggregate mixture of the present invention for one hour, the degradation point is increased to approximately 1,900 psi and increases to a maximum of approximately 3,400 psi after approximately 5 hours of storage.

Improved Pollutant Storage

The second embodiment of the present invention embodies a novel method for the removal and storage of pollutants, whether they be heavy metal, radioactive or fibrous. After the coal materials of the first and second portions have been either soft burned or expanded and leached, and crushed to fine particulate coal material and larger sized coal material (with a maximum diameter of ¾ of an inch), the larger sized coal materials of both the first and second portions are utilized as filter materials to extract pollutants from a liquid effluent stream. If it is desired to remove heavy metals, larger sized non-burned coal materials from the second portion are arranged such that a liquid-effluent stream may be directed therethrough. If the pollutants in the effluent stream consist of petroleum products, such as paints, oils, greases, etc., or fine fibers, such as asbestos or cellulose fibers, soft-burned coal materials from the first portion are utilized. While it is recognized that the primary absorption of pollutants occurs in the larger sized coal materials of the first and second portions, the filter medium may also contain the fine particulant coal materials of either or both of the first and second portions, and some pollution absorption will undoubtedly occur thereon. It has been experimentally determined that, depending upon the initial concentration of pollutants in the effluent stream, from 90% to 99.9% of most radioactive and heavy metal pollutants may be removed by a filter medium of the present invention.

It may be preferable to effect the absorption of pollutants onto the coal materials at the source of the pollution, so that after drying the coal materials in the filter medium, they may be transported in a dry, solid condition as opposed to a liquid state. Alternatively, the entire process of the second embodiment may occur at the pollutant source, since asphalt pugmills are relatively mobile.

With a typical petroleum based asphalt (such as an asphalt with penetration grade 85/100) heated to approximately 350° to 400° F. in an asphalt pugmill, the larger sized coal materials with the pollutants absorbed thereon are added to the pugmill with the fine particulate coal materials. The fine particulate coal materials should be added with at least 50% being the soft burned fine particulate coal materials of the first portion. It has been found preferable to use approximately 75% of the first portion totally approximately 6 to 8% by weight of the total asphalt/coal material mixture. (There is no need for the addition of rock or sand aggregates, since the larger sized coal materials will function as aggregate.) The asphalt coal material mixture should remain in the pugmill at approximately 400° F. for at least 3 minutes, with extended storage at this temperature increasing the strength of the bonds between the asphalt and coal materials. After the asphalt/coal material is removed from the pugmill, it may be formed and/or compressed into the appropriate shape for storage or disposal.

What is claimed is:

1. A method of producing an improved asphalt/aggregate mixture having strong adhesive bonds therebetween, said method comprising the steps of:
   a. crushing and screening a low carbon content coal material to produce a quantity of fine particulate coal material having a maximum diameter passing through a 200 mesh screen,
   b. burning a first portion of said fine particulate coal material at from 350° F. to 850° F.,
   c. expanding the internal and external surface area of a second portion of said fine particulate coal material by exposing said coal material to at least one cycle of wetting and drying,
   d. leaching said second portion of said fine particulate coal material with water to remove water soluble and adhering substances therefrom,
   e. adding said first and second portions of said fine particulate coal material to an asphalt/aggregate mixture comprising asphalt and non-coal aggregates, said fine particulate coal materials being added in a proportion of at least 50% of said first portion fine particulate coal materials, and
   f. heating said mixture,
whereby said asphalt/aggregate mixture completely encapsulates said fine particulate coal material and said non-coal aggregates, materially enhancing the bonding strength between said non-coal aggregates and said asphalt mix.

2. The method as recited in claim 1, further comprising selecting a coal material from the group consisting of bone coal, coal shale, clayey coal, near coal, burned and unburned coal wastes, and brown coal.

3. The method as recited in claim 1, further comprising burning said first portion of said coal materials at from approximately 550° F. to 650° F. for from two to ten hours.

4. The method as recited in claim 1, further comprising expanding the surface of said second portion of said coal materials by saturating said coal with water for from ½ hour to 4 hours.

5. The method as recited in claim 1, further comprising drying said coal materials to remove the water therein by heating said materials with radient energy for from one to four hours.

6. The method as recited in claim 4, further comprising exposing said coal materials to at least seven wetting and drying cycles.

7. The method as recited in claim 1, further comprising leaching said second portion of said coal materials with a material selected from a group consisting of hot or cold water, steam, hydrochloric acid, sodium hydroxide, and mixtures thereof.

8. The method as recited in claim 7, further comprising leaching said second portion of said coal materials with a base and an acid.

9. The method as recited in claim 1, further comprising mixing said fine particulate coal materials with said asphalt/aggregate mixture, with said fine particulate coal materials in the proportion of from 3 to 4 parts burned coal materials of said first portion to one part non-burned coal materials of said second portion, such that said fine particulate coal materials will equal approximately 6 7% of the total weight of said mixture.

10. The method as recited in claim 1, further comprising the step of storing said mixture of said first and second portions of said coal materials and said asphalt/aggregate mixture for a period of at least one hour at a temperature sufficiently high to increase the strength of said bond between said coal materials and said asphalt/aggregate mixture.

11. A method of encapsulating toxic pollutants for long term storage or disposal comprising the steps of
   a. crushing and screening a low carbon content coal material to produce a quantity of fine particulate coal material having a maximum diameter passing through a 200 mesh screen, and a larger size coal material having a maximum diameter of ¾ of an inch,
   b. burning a first portion of said fine particulate and larger size coal materials at from 350° F. to 850° F.,
   c. expanding the internal and external surface area of a second portion of said fine particulate and larger size coal materials by exposing said coal materials to at least one cycle of wetting and drying,
   d. leaching said second portion of said fine particulate and larger size coal materials with water to remove water soluble and adhering substances therefrom, e. providing a filter medium comprising either or both of said first and second portions of said larger size coal materials and directing a pollutant-containing liquid stream therethrough, f. mixing said first and second pollutant-containing larger size coal materials with asphalt mix, g. adding said first and second portions of said fine particulate coal material to said asphalt-larger size coal material mixture in a proportion of at least 50% of said first portion fine particulate coal material, and h. heating said mixture, whereby said asphalt mix completely encapsulates said pollutant containing larger size particles and said smaller size particles materially enhance the bonding strength between said larger size coal materials and said asphalt mix.

12. The method as recited in claim 11, further comprising selecting a coal material from the group consisting of bone coal, coal shale, clayey coal, near coal, burned and unburned coal wastes, or brown coal.

13. The method as recited in claim 11, further comprising burning said first portion of said fine particulate coal materials at from approximately 550° F. to 650° F. for from two to ten hours.

14. The method as recited in claim 11, further comprising expanding the surface area of said second portion of said coal materials by saturating said coal with water for from ½ hour to 4 hours.

15. The method as recited in claim 14, further comprising drying said coal materials to remove the water therein by heating said materials with radient energy for from one to four hours.

16. The method as recited in claim 14, further comprising exposing said coal materials to at least seven wetting and drying cycles.

17. The method as recited in claim 11, further comprising leaching said second portion of said coal materials with a material selected from a group consisting of hot or cold water, steam, hydrochloric acid, sodium hydroxide, and combinations thereof.

18. The method as recited in claim 11, further comprising removing heavy metals from a pollutant bearing effluent stream by filtering said stream through a filter medium comprising a second portion of said larger size coal materials.

19. The method as recited in claim 18, further comprising removing petroleum products and/or fiberous material from an effluent stream by filtering said stream through a filter medium comprised primarily of a first portion of said larger size coal materials.

20. The method as recited in claim 19, further comprising cooling said pollutant bearing asphalt mixture and compressing said mixture into a desired shape for storage or disposal.

21. The method as recited in claim 11, further comprising mixing said fine particulate coal materials with said larger size coal materials and said asphalt mix, with said fine particulate coal materials in the proportion of from 3 to 4 parts burned coal materials of said first portion to one part non-burned coal materials of said second portion, such that said fine particulate coal materials will equal approximately 6 to 8% of the total weight of said mixture.

22. The method as recited in claim 11, further comprising storing said mixture of said first and second and portions of said coal materials and said asphalt mixture for a period of at least one hour at a temperature sufficiently high to increase the strength of said bond between said coal materials and said asphalt.

23. An improved asphalt/aggregate mixture having increased wear life, said asphalt mixture being impervious to water, physical stresses or petroleum products, said mixture comprising a. a petroleum based asphalt mixture, b. a first coal additive characterized in that it has been burned at from 350° F. to 850° F., said first coal additive being provided as fine particulate coal materials and as larger size coal materials, and c. a second coal additive characterized in that its internal and external surface areas have been expanded and leached, said second coal additive being provided as fine particulate coal materials and as larger size coal materials, whereby said asphalt mix completely encapsulates said fine particulate and larger size coal materials thereby materially enchancing the bonding strength between said larger size coal materials and said asphalt mix.

24. The mixture as recited in claim 23, wherein said mixture comprises coal additives chosen from the group consisting of bone coal, coal shale, clayey coal, near coal, burned and unburned coal wastes and brown coal.

25. The mixture as recited in claim 23, wherein said first and second coal additives comprise a fine particulate coal material and a larger size coal material, said fine particulate coal material having a maximum diameter passing through 200 mesh screen and said larger size coal material having a maximum diameter of ¾ of an inch.

26. The mixture as recited in claim 25, wherein said fine particulate coal materials of said first and second coal additives are added to said mixture in the proportion of at least 50% of said first coal additives, such that said smaller size particles will equal approximately 6 to 8% of the total weight of said mixture.

27. The mixture as recited in claim 26, wherein said fine particulate coal materials of said first and second coal additives are added to said mixture in a proportion of from 3 to 4 parts of said first coal additive to one part of said second coal additives, such that said fine particulate coal material will equal approximately 6 to 8% of the total weight of said mixture.

28. The mixture as recited in claim 23, wherein said mixture is stored for a period of at least one hour at a temperature sufficiently high to increase the strength of the bonds between said coal additives and said asphalt mixture.

29. A method producing an improved asphalt/aggregate mixture having strong adhesive bonds therebetween, said method comprising the steps of:

a. crushing and screening a low carbon content coal material to produce a quantity of fine particulate coal material having a maximum diameter passing through 200 mesh screen, and a larger size coal material having a maximum diameter of ¾ of an inch, b. burning a first portion of said fine particulate and larger size coal materials at from 350° F. to 850° F., c. expanding the internal and external surface area of a second portion of said fine particulate and larger size coal materials by exposing said coal materials to at least one cycle of wetting and drying, d. leaching said second portion of said fine particulate and larger size coal materials with water to remove water soluble and adhering substances therefrom, e. mixing said fine particulate coal materials and said larger size coal materials of said first and second portions with a petroleum asphalt mixture, and
f. heating said mixture, whereby said asphalt mixture completely encapsulates said coal materials, materially enhancing the bonding strength between said asphalt mixture and said coal materials.

* * * * *